(12) United States Patent
Pan et al.

(10) Patent No.: US 9,099,875 B2
(45) Date of Patent: Aug. 4, 2015

(54) REVERSE-CONNECTION PROTECTING DEVICE AND BACKUP POWER SUPPLY INCLUDING THE SAME

(75) Inventors: Qiuping Pan, Shenzhen (CN); Qingfei Zheng, Shenzhen (CN); Xiangjun Dai, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 817 days.

(21) Appl. No.: 13/035,238

(22) Filed: Feb. 25, 2011

(65) Prior Publication Data

US 2011/0211286 A1    Sep. 1, 2011

(30) Foreign Application Priority Data

Feb. 27, 2010    (CN) .................... 2010 2 0122605 U

(51) Int. Cl.
*H02H 3/00* (2006.01)
*H02J 7/00* (2006.01)
*H02J 9/06* (2006.01)
(Continued)

(52) U.S. Cl.
CPC ............ *H02J 7/0034* (2013.01); *H01M 10/44* (2013.01); *H01M 10/48* (2013.01); *H02J 9/061* (2013.01); *H01M 2220/10* (2013.01)

(58) Field of Classification Search
CPC .............................. H02J 7/0034; H01M 10/48
USPC .......................................................... 361/86
See application file for complete search history.

(56) References Cited

U.S. PATENT DOCUMENTS

| 5,656,956 | A | * | 8/1997 | Ohta et al. ..................... 326/120 |
| 5,969,436 | A | | 10/1999 | Chalasani et al. |
| 6,385,030 | B1 | * | 5/2002 | Beene ........................... 361/119 |

(Continued)

FOREIGN PATENT DOCUMENTS

| CN | 101437081 A | 5/2009 |
| CN | 201270416 Y | 7/2009 |

(Continued)

OTHER PUBLICATIONS

EPO Application No. EP 11155744.3, Supplementary European Search Report and European Search Opinion, mailed Aug. 11, 2004.
(Continued)

*Primary Examiner* — Thienvu Tran
*Assistant Examiner* — Ann Hoang
(74) *Attorney, Agent, or Firm* — Alston & Bird LLP

(57) ABSTRACT

A reverse-connection protecting device comprises an interface, a battery control module and an activation module. The interface includes first and second lead-in ends coupled to respective ones of first and second lead-out ends. The second lead-in end is couplable to a negative terminal of a backup battery. The second lead-out end is couplable to each negative terminal of a load and an external power supply. The battery control module is coupled to the first lead-in end of the interface and couplable to a positive terminal of the backup battery. The battery control module is configured to control the charging or discharging of the backup battery. The activation module is coupled to the battery control module, and couplable to the load and the external power supply. The activation module is configured to drive the battery control module after the external power supply is powered on, but disable the battery control module in an instance in which the load, the backup battery or the external power supply is reversely connected.

14 Claims, 2 Drawing Sheets

(51) Int. Cl.
H01M 10/44 (2006.01)
H01M 10/48 (2006.01)

(56) References Cited

U.S. PATENT DOCUMENTS

| | | | |
|---|---|---|---|
| 8,072,189 B2* | 12/2011 | Sakurai et al. | 320/165 |
| 8,212,403 B2 | 7/2012 | Dai et al. | |
| 2007/0262651 A1 | 11/2007 | Odaohara | |
| 2009/0009138 A1* | 1/2009 | Ahmad et al. | 320/137 |
| 2011/0141632 A1 | 6/2011 | Mi et al. | |
| 2011/0211286 A1 | 9/2011 | Pan et al. | |

FOREIGN PATENT DOCUMENTS

| | | |
|---|---|---|
| CN | 201349143 Y | 11/2009 |
| CN | 201639290 U | 11/2010 |
| EP | 1137145 A | 9/2001 |
| JP | 2002010485 A | 1/2002 |
| JP | 2007014165 A | 1/2007 |
| JP | 2007082374 A | 3/2007 |
| RU | 2264015 C1 * | 11/2005 |
| WO | WO 91/15046 A1 | 10/1991 |
| WO | WO 2010/028579 A1 | 3/2010 |

OTHER PUBLICATIONS

WIPO Application No. PCT/CN2011/071331, International Search Report and Written Opinion of the International Searching Authority, mailed May 26, 2011.

* cited by examiner

REVERSE-CONNECTION PROTECTING DEVICE AND BACKUP POWER SUPPLY INCLUDING THE SAME

CROSS-REFERENCE TO RELATED APPLICATION

This application claims foreign priority benefits under 35 U.S.C. §119 of Chinese Patent Application Serial No. 201020122605.5, filed on Feb. 27, 2010, the content of which is incorporated herein by reference in its entirety.

TECHNICAL FIELD

The disclosure relates to a power supply, and more particularly to a reverse-connection protecting device and a backup power supply comprising the same.

BACKGROUND

Uninterruptible power supplies are very important in protecting valuable electronic appliances, communication systems and various other applications from sudden power failure or other problems related to power loss. For those places where sudden power failure problems are common, uninterruptible power supplies, such as a backup power supply, play a major role by providing continuous power supply.

To protect against reverse-connection and over-voltage conditions, high-voltage reverse-connection protection diodes, transient voltage suppressor (TVS) diodes or fuses are conventionally used. The replacements of diodes or fuses, however, are very inconvenient.

BRIEF SUMMARY

According to one exemplary embodiment of the invention, an apparatus comprises an interface, a battery control module, and an activation module. The interface has first and second lead-in ends coupled to respective ones of first and second lead-out ends. The second lead-in end is couplable to a negative terminal of a backup battery. The second lead-out end is couplable to negative terminals of a load and an external power supply. The battery control module is coupled to the first lead-in end of the interface and couplable to a positive terminal of the backup battery. The battery control module is configured to control the charging or discharging of the backup battery. The activation module is coupled to the battery control module and couplable to the load and the external power supply. The activation module is configured to drive the battery control module after the external power supply is powered on, but disable the battery control module in an instance in which the load, the backup battery or the external power supply is reversely connected.

According to another exemplary embodiment of the present invention, the apparatus comprises an interface, a battery control module, a switch unit and a switch control module. The interface has first and second lead-in ends coupled to respective ones of first and second lead-out ends. The second lead-in end is couplable to a negative terminal of a backup battery. The second lead-out end is couplable to negative terminals of a load and an external power supply. The battery control module is coupled to the first lead-in end of the interface and couplable to a positive terminal of the backup battery. The battery control module is configured to control the charging or discharging of the backup battery. The switch unit is coupled to the first lead-out end and couplable to positive terminals of the load and the external power supply such that, when coupled to the respective positive terminals, the switch unit is disposed between the first lead-out end and the respective positive terminals. The switch control module is coupled to the switch unit and configured to receive voltage signals on the first and second lead-out ends of the interface, and control ON or OFF of the switch unit in accordance with the received voltages.

BRIEF DESCRIPTION OF THE DRAWINGS

The foregoing summary, as well as the following detailed description of the invention, will be better understood when read in conjunction with the appended drawings. The embodiments illustrated in the figures of the accompanying drawings herein are by way of example and not by way of limitation. In the drawings.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
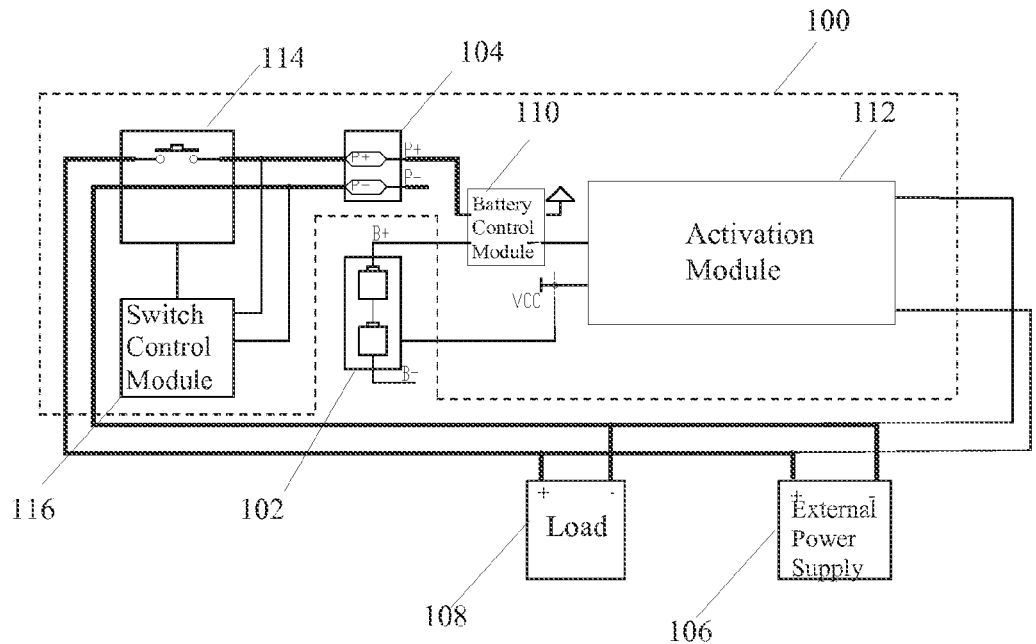
FIG. 1 illustrates a diagram of a backup power supply according to one exemplary embodiment of the present invention.

FIG. 1 is a diagram of a backup power supply according to one exemplary embodiment of the present invention ("exemplary" as used herein referring to "serving as an example, instance or illustration"). As shown, the backup power supply includes a reverse-connection protecting device 100 and a backup battery 102, such as a nickel-hydrogen battery, a nickel-cadmium battery, or a lithium-ion battery. The reverse-connection protecting device 100 includes an interface 104 configured to couple the backup battery 102 to an external power supply 106 and load 108 for charging and discharging the backup battery 102. The reverse-connection protecting device 100 also includes a battery control module 110 configured to control the charging or discharging of the backup battery 102, an activation module 112 configured to drive the battery control module 110, a switch unit 114 (e.g., a normally open switch), and a switch control module 116 coupled to the switch unit 110.

In various example embodiments, the interface 104 may be a four-terminal interface with two lead-in ends and two lead-out ends. As shown, for example, the interface 104 includes first and second lead-in ends (not numbered) coupled to respective ones of first and second lead-out ends (not numbered). The first lead-in end is coupled to the battery control module 110, which is coupled to a positive terminal (B+) of the backup battery 102. The first lead-out end is coupled to one end of the switch unit 114 the other end of which is coupled to positive terminals of the load 108 and external power supply 106. The second lead-in end is coupled to a negative terminal (B−) of the backup battery 102 (not shown), and the second lead-out end is coupled to negative terminals of the load 108 and external power supply 106. The switch control module 116 is configured to control ON/OFF of the switch unit 114 in accordance with voltages on the first and second lead-out ends of the interface 104.

The activation module 112 is coupled to the battery control module 110, the load 108 and the external power supply 106. The activation module 112 is configured to drive the battery control module 110 after the external power supply 106 is powered on, but disable the battery control module 106 in an instance in which the interface 104, the load 108, the backup battery 102 or the external power supply 106 is reversely connected. In other words, in an instance in which a positive terminal is accidently coupled to a negative terminal, the battery control module 106 may be disabled. In this example embodiment, the backup battery 102, the interface 104, the battery control module 110, the load 108 and the external power supply 106 may form a main charging and discharging circuit (not numbered).

Figure 2:
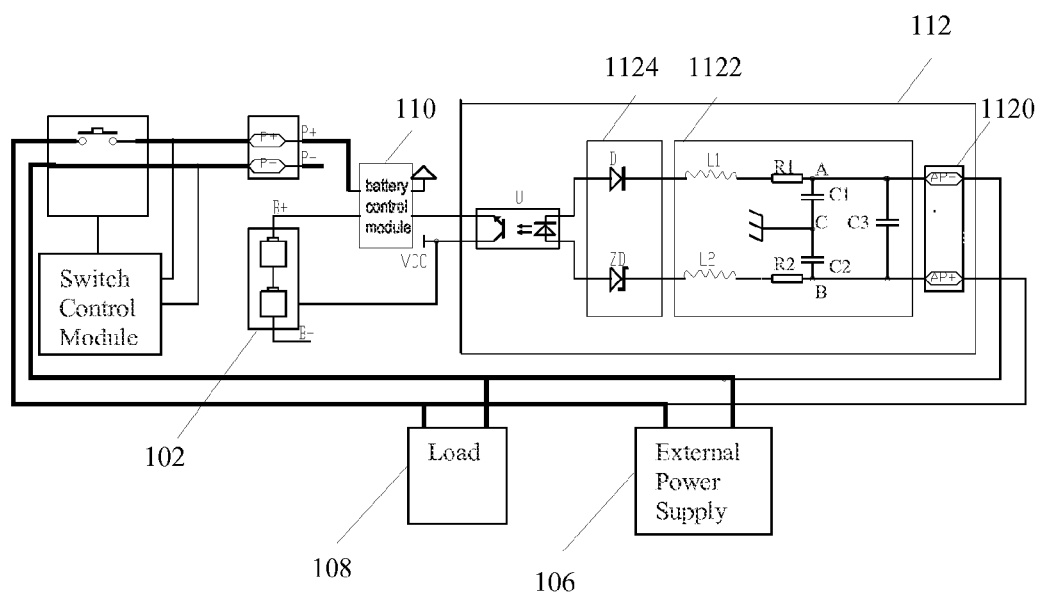
FIG. 2 illustrates a circuit diagram of an activation module of a backup power supply according to one exemplary embodiment of the present invention.

FIG. 2 illustrates a circuit diagram of an example activation module 112 of a backup power supply according to one exemplary embodiment of the present invention. As shown in FIG. 2, the activation module 112 may include an activation terminal 1120 (e.g., an anti-mistake activation terminal) coupled to a lightning protection circuit 1122, and a voltage stabilizing and reverse-connection protecting circuit 1124 coupled between the lightning protection circuit 1122 and an optical coupler U. The activation terminal 1120 may be coupled to the load 108 and the external power supply 106. The optical coupler U includes first and second input ends (not numbered) coupled to the voltage stabilizing and reverse-connection protecting circuit 1124. The optical coupler U also includes an output end coupled to the battery control module 110.

The lightning protection circuit 1122 may include a capacitor C1, a capacitor C2, a current-limiting resistor R1, a current-limiting resistor R2, a magnetic bead L1 and a magnetic bead L2. The activation terminal 1120 is coupled between nodes A and B. The capacitor C1 and the capacitor C2 are disposed in series between the nodes A and B, and in series, are disposed in parallel with the activation terminal 1120. A node C between the capacitor C1 and the capacitor C2 is grounded. In one instance, the lightning protection circuit 1122 may include a capacitor C3 disposed between the nodes A and B in parallel with the series combination of the first capacitor C1 and the second capacitor C2, and in turn, disposed in parallel with the activation terminal 1120. One end of the magnetic bead L1 is coupled to one end of the current-limiting resistor R1, and the other end of the current-limiting resistor R1 is coupled to the node A. Similarly, one end of the magnetic bead L2 is coupled to one end of the current-limiting resistor R2, and the other end of the current-limiting resistor R2 is coupled to the node B.

The voltage stabilizing and reverse-connection protecting circuit 1124 may include a diode D and a zener diode ZD. A cathode end of the diode D is coupled to the other end of the magnetic bead L1 opposite the current-limiting resistor R1, and an anode end of the diode D is coupled to the first input end (not numbered) of the optical coupler U. Similarly, a cathode end of the zener diode ZD is coupled to the other end of the magnetic bead L2 opposite the current-limiting resistor R2, and an anode end of the zener diode ZD is coupled to the second input end of the optical coupler U.

In operation, the magnetic bead L1 and the magnetic bead L2 may prevent static electricity in or on the activation terminal 1120. The current-limiting resistor R1 and the current-limiting resistor R2 may limit the current flowing in the activation module 112 and reduce the current impact caused by lightning strikes. The capacitor C1 and the capacitor C2 may release any static electricity or common-mode lightning surge current, and the capacitor C3 may release any static electricity or differential-mode lightning surge current. When the load 108, the backup battery 102, the activation terminal, or the external power supply 106 is reversely connected, or another reverse-connection condition occurs, the voltage stabilizing and reverse-connection protecting circuit 1124 may disconnect the main charging and discharging circuit from the backup battery 102 or discontinue circuit operation. In one instance, the voltage stabilizing and reverse-connection protecting circuit 1124 may disconnect the main charging and discharging circuit by disconnecting the diode D. The main charging and discharging circuit is therefore protected from the reverse-connection condition.

In an instance in which the voltage of the external power supply 106 is lower than required or unstable, the zener diode ZD may help the activation module 112 avoid being repeatedly enabled. If the external power supply 106 supplies a voltage that does not reach a breakdown voltage of the zener diode ZD, the activation module 112 may not conduct. The battery control module 110 may therefore be disabled, which may disconnect the backup battery 102 from the main charging and discharging circuit. The optical coupler U may be used as a switch to control the connection between the activation module 112 and the backup battery 102. The optical coupler U may be also used to separate the backup battery 102 from the external power supply 106 to avoid any negative effect on the battery control module 110 that may otherwise be caused by different electrical levels.

Figure 3:
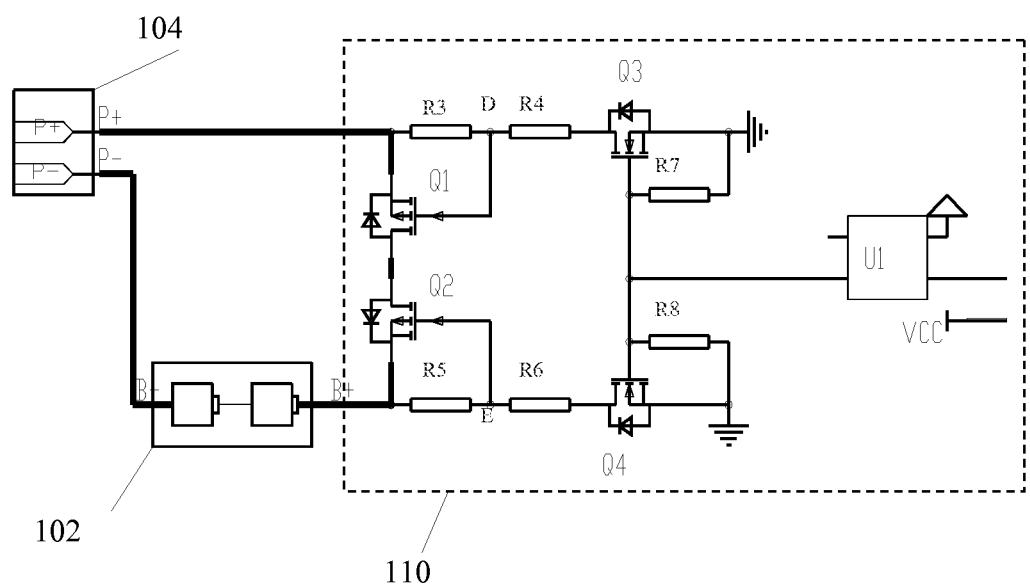
FIG. 3 illustrates a circuit diagram of a battery control module of a backup power supply according to one exemplary embodiment of the present invention.

FIG. 3 illustrates a circuit diagram of a battery control module 110 of a backup power supply according to one exemplary embodiment of the present invention. The battery control module 110 may include a number of field effect transistors (FETs) including FET Q1, FET Q2, FET Q3 and FET Q4, and may also include a resistor R3 coupled in series with a resistor R4, a resistor R5 coupled in series with a resistor R6, and a microcomputer U1 (e.g., single-chip microcomputer). As shown, a gate node of the FET Q1 is coupled to a node D between the resistor R3 and the resistor R4, a source node of the FET Q1 is coupled to the first lead-in end of the interface 104 and the end of the resistor R3 opposite the end coupled to the resistor R4, and a drain node of the FET Q1 is coupled to a drain node of the Q2. A gate node of the FET Q2 is coupled to a node E between the resistor R5 and the resistor R6, and a source node of the FET Q2 is coupled to the positive terminal of the backup battery 102 and the end of the resistor R5 opposite the end coupled to the resistor R6. The end of the resistor R4 opposite the end coupled to the resistor R3 is coupled to a drain node of the FET Q3, and similarly, the end of the resistor R6 opposite the end coupled to the resistor R5 is coupled to a drain node of the FET Q4. A gate node of the FET Q3 is coupled to a gate node of the FET Q4.

The microcomputer U1 includes an input terminal (not numbered) coupled to the activation module 112 (shown in FIGS. 1 and 2), and output terminal (not numbered) coupled to the gate nodes of the FET Q3 and the FET Q4.

In one example, the battery control module 110 may further include a resistor R7 and a resistor R8. Drain node of the FET Q3 may be coupled to its gate node through the resistor R7. Drain node of the FET Q4 may be coupled to its gate node through the resistor R8.

Referring again to FIGS. 1 and 2, in various instances, the interface 104, the load 108 or the external power supply 106 may be reversely connected thereby destroying the entire circuit. In various other instances, the backup power supply such as the backup battery 102 may not supply power to the circuit at normal conditions. Example embodiments of the present invention may therefore provide activation of the backup battery 102 to enable it to charge or discharge. The activation of the backup battery 104 may be implemented by enabling the activation module 112. For example, with reference to FIG. 2, when the external power supply 106 is powered on, an electric signal may be transmitted to the optical coupler U from the activation terminal 1120, the lightning protection circuit 1122 and the voltage stabilizing and reverse-connection protecting circuit 1124. The electrical signal may then be output from the optical coupler U to the battery control module 110. The output signal may be received by the microcomputer U1 of the battery control module 110 to control the connection or disconnection of the backup battery 102 to the main charging and discharging circuit. When electric quantity of the backup battery 102 is insufficient due to overcharge or over-discharge, the battery control module 110 may disconnect the connection between the backup battery 102 and the interface 104 by opening the channels of the FETs in the battery control module 110 (shown in FIG. 3). When the microcomputer U1 is enabled by the electrical signal sent from the activation module 112, the FETs resume conduction which allows the main charging and discharging circuit to resume conduction. The backup battery 102 is accordingly connected to the interface 104 through the battery control module 110 and is able to be charged or discharged.

With reference to FIGS. 1 and 2, the switch control module 116 may include a sampling circuit (not shown) and a control chip (e.g, integrated circuit, microprocessor—not shown). The sampling circuit is configured to receive voltage signals, and the control chip is configured to provide a control signal to the switch unit 114 in accordance with the received voltage signals. If the main charging and discharging circuit is not reversely connected, a received voltage signal may be positive, and the control chip may turn on the switch unit 114 to permit the main charging and discharging circuit to conduct. On the other hand, when the main charging and discharging circuit is reversely connected, the voltage signal may be negative, and the switch control module 116 cuts off the switch unit 114 to disconnect the backup battery 102 and thereby avoid power loss and failure problems.

It will be appreciated by those skilled in the art that changes could be made to the examples described above without departing from the broad inventive concept. It is understood, therefore, that this invention is not limited to the particular examples disclosed, but it is intended to cover modifications within the spirit and scope of the present invention as defined by the appended claims.

What is claimed is:

1. An apparatus comprising:
   an interface coupled between a backup battery and a load;
   a battery control module coupled to the interface and the backup battery, the battery control module configured to control the charging or discharging of the backup battery; and
   an activation module coupled between the battery control module and an external power supply parallel with the load, the activation module comprising:
   an activation terminal coupled between a first node and a second node;
   a lightning protection circuit coupled to the activation terminal, the lightning protection circuit comprising a capacitor coupled between the first node and the second node, wherein the lightning protection circuit further comprises:
   a first capacitor and a second capacitor connected to each other at a third node between the first node and the second node;
   a magnetic bead, and
   a current-limiting resistor coupled between the magnetic bead and the first node;
   wherein the activation module is configured to disable the battery control module in an instance in which one of the load, the backup battery and the external power supply is reversely connected;
   a voltage stabilizing and reverse-connection protecting circuit coupled to the lightning protection circuit; and
   an optical coupler coupled between the voltage stabilizing and reverse-connection protecting circuit and the battery control module.

2. The apparatus of claim 1, wherein the activation terminal comprises an anti-mistake activation terminal.

3. The apparatus of claim 1, wherein the voltage stabilizing and reverse-connection protecting circuit further comprises a diode coupled to the optical coupler.

4. The apparatus of claim 1, wherein the voltage stabilizing and reverse-connection protecting circuit further comprises a zener diode coupled between the magnetic bead and the optical coupler.

5. The apparatus of claim 1, wherein the battery control module comprises:
   a field effect transistor; and
   a resistor coupled between a gate node and a source node of the field effect transistor.

6. The apparatus of claim 1, wherein the battery control module further comprises:
   a field effect transistor; and
   a resistor coupled between a drain node and a gate node of the field effect transistor.

7. The apparatus of claim 1, wherein battery control module further comprises:
   a first field effect transistor;
   a second field effect transistor; and
   a resistor coupled between a gate node of the first field effect transistor and a source node of the second field effect transistor.

8. The apparatus of claim 1, further comprising:
   a switch unit coupled between the interface and at least one of the load and the external power supply; and
   a switch control module coupled to the switch unit and configured to control operation of the switch unit in accordance with voltages on the interface.

9. The apparatus of claim 8, wherein the switch control module comprises:
   a sampling circuit configured to receive a voltage signal; and
   a control circuit configured to provide a control signal to the switch unit in accordance with the received voltage signal.

10. The apparatus of claim 9, wherein the switch unit is on in an instance in which the voltage signal is positive and is off in an instance in which the voltage signal is negative.

11. An apparatus comprising:
    an interface coupled between a backup battery and a load;
    a battery control module coupled to the interface and the backup battery, the battery control module configured to control the charging or discharging of the backup battery; and
    an activation module coupled between the battery control module and an external power supply paralleled with the load, the activation module comprising:

a lightning protection circuit, the lightning protection circuit comprising a magnetic bead; wherein the lightning protection circuit further comprises:
 a first capacitor and a second capacitor connected to each other at a third node between a first node and a second node; and
 a current-limiting resistor coupled between the magnetic bead and the first node;
a voltage stabilizing and reverse-connection protecting circuit coupled to the lightning protection circuit; and
an optical coupler coupled between the voltage stabilizing and reverse-connection protecting circuit and the battery control module.

12. The apparatus of claim 11, wherein the backup battery comprises one of a nickel-hydrogen battery, a nickel-cadmium battery and a lithium-ion battery.

13. The apparatus of claim 11, wherein the battery control module comprises:
a field effect transistor; and
a resistor coupled between a gate node and a source node of the field effect transistor.

14. The apparatus of claim 11, wherein the battery control module further comprises:
a field effect transistor; and
a resistor coupled between a drain node and a gate node of the field effect transistor.

\* \* \* \* \*